United States Patent
Tsuda et al.

[11] Patent Number: 6,030,029
[45] Date of Patent: Feb. 29, 2000

[54] PANEL MOUNTING SYSTEM FOR A VEHICLE

[75] Inventors: Toshio Tsuda; Shigeo Harada; Hiroyasu Nagata, all of Amagasaki, Japan

[73] Assignee: Kanzaki Kokyukoki Mfg. Co., Ltd., Hyogo-ken, Japan

[21] Appl. No.: 09/164,458

[22] Filed: Oct. 1, 1998

[30] Foreign Application Priority Data

Oct. 2, 1997 [JP] Japan ..................................... 9-269972
Oct. 9, 1997 [JP] Japan ..................................... 9-277704

[51] Int. Cl.$^7$ ........................................................ B60J 7/00
[52] U.S. Cl. .......................... 296/194; 296/193; 296/198; 180/69.21; 180/89.17; 293/115
[58] Field of Search ............................. 296/191, 29, 196, 296/197, 194, 76, 185, 193; 180/89.17, 69.2, 69.21, 68.6; 293/115

[56] References Cited

U.S. PATENT DOCUMENTS

| | | | |
|---|---|---|---|
| 1,454,595 | 5/1923 | Ashley | 180/69.2 |
| 2,862,760 | 12/1958 | Davis | 296/196 |
| 2,952,328 | 9/1960 | Steiner | 180/69.2 |
| 2,962,107 | 11/1960 | Mihal et al. | 293/115 |
| 3,815,701 | 6/1974 | Mayhew | 180/69.21 |

(List continued on next page.)

FOREIGN PATENT DOCUMENTS

| | | | |
|---|---|---|---|
| 0171359 | 7/1990 | Japan | 293/115 |
| 403182838 | 8/1991 | Japan | 180/69.21 |
| 403271081 | 12/1991 | Japan | 180/69.21 |
| 7-242183 | 9/1995 | Japan . | |
| 0651792 | 10/1985 | Switzerland | 180/89.17 |

*Primary Examiner*—Joseph D. Pape
*Assistant Examiner*—Kiran Patel
*Attorney, Agent, or Firm*—Sterne, Kessler, Goldstein & Fox PLLC

[57] ABSTRACT

A bonnet of a vehicle, which contains an engine room, consists of a front panel and side panels mounted on a frame structure of the vehicle and a hood vertically rotatably mounted over the front and side panels. Left and right second upright frames are erected on the upper surface of a front portion of a bottom plate which is spread over left and right horizontal frames. The left and right second upright frames are provided with a forward segment having an upward pin. The upper outer side surface of the left and right second upright frames are further provided with a lateral, outward segment having an upward pin. A first upright frame, which supports a dashboard, is provided on its left and right outer portions thereof with lateral outward segments having upward pins. Left and right horizontal frames are provided on the lower outer side portions of first upright frame with respective segments having respective holes. The front portion of the bottom plate is provided with holes. The upper portion of the front panel is provided with rearwardly projecting left and right lateral segments having holes. The lower end of the front panel is provided with downwardly projecting left and right dowels. The front panel is mounted on the front portion of the bottom plate so as to be checked in its longitudinal and lateral movement by the respective engagement of the segment pins on the first upright frame with the segment holes of the front panel and the front panel dowels with the bottom plate holes. Each side panel is provided on the upper end thereof with laterally, inwardly projecting front and rear segments and on the lower end thereof with a downward pin. Each side panel is mounted on its respective horizontal frame so as to be checked in its longitudinal and lateral movement by the respective engagement of the pins located on the second upright support, the first upright support and the lower portion of the side panel with the holes in the segments disposed on the front upper portion of the side panel, the rear upper portion of the side panel and the horizontal frame, respectively. The closed hood suppresses the mounted front and side panels thereby preventing their vertical movement.

18 Claims, 9 Drawing Sheets

U.S. PATENT DOCUMENTS

| | | | |
|---|---|---|---|
| 4,027,913 | 6/1977 | Youngers et al. | 296/197 |
| 4,260,280 | 4/1981 | Hirn et al. | 296/196 |
| 4,319,653 | 3/1982 | Carlson | 180/89.17 |
| 4,572,312 | 2/1986 | France et al. | 180/89.17 |
| 4,785,900 | 11/1988 | Nasky | 180/69.21 |
| 4,832,399 | 5/1989 | Kosuge | 296/198 |
| 4,914,802 | 4/1990 | Takao et al. . | |
| 4,969,533 | 11/1990 | Holm et al. | 180/69.2 |
| 5,011,217 | 4/1991 | Simpson et al. | 296/194 |
| 5,193,636 | 3/1993 | Holm | 180/69.21 |
| 5,209,314 | 5/1993 | Nishiyama | 180/68.6 |
| 5,215,157 | 6/1993 | Teich . | |
| 5,503,444 | 4/1996 | Rouse et al. | 180/68.6 |
| 5,718,303 | 2/1998 | Ogasawara et al. | 180/69.21 |
| 5,782,312 | 7/1998 | Murakawa | 180/69.2 |
| 5,901,803 | 5/1999 | Harada | 180/69.21 |

PANEL MOUNTING SYSTEM FOR A VEHICLE

BACKGROUND OF THE INVENTION

1. Field of the Invention

The present invention is related to a system for mounting front and side panels to a vehicle, particularly an agricultural or other general utility tractor, so that together with a hood an engine room enclosure is formed.

2. Related Art

Conventionally, a working vehicle like an agricultural or mowing tractor is provided in its engine room with a radiator, a cooling fan, an engine and the like. The engine room is covered on top with a hood. The front and sides of the engine room are enclosed by front and side panels. The hood and panels may be opened and detached for maintenance and repair.

Japanese Patent No. Hei 7-242,183 describes a structure which has side panels that are easily removably mounted. In the structure, each side panel is provided with an engaging projection and a vehicle body frame is provided with a corresponding U-like shaped spring means. The side panel is anchored onto the body frame by inserting the engaging projection into the spring means. Thus, the side panel can be attached by laterally inserting or detached by laterally removing the engaging projection. However, this configuration allows the side panel to sway which over time results in an increase of abrasion of the spring means and a corresponding decrease of elasticity thereof. This damage to the spring means can eventually lead to the spring means detaching on its own. During traveling operation of the vehicle having such swaying side panels, uncomfortable vibration is generated, thereby making the vehicle hard to control. Also, in the worst case, laterally moving side panels may fall off during traveling operation causing them to be damaged or deformed. The front panel is subject to similar harm.

The present invention provides a panel mounting system for mounting a front panel and two side panels to a vehicle such that the engaging portions thereof are free from the abrasion or deformation which normally results from long-term use of the vehicle. Furthermore, this invention allows the panels to be simply attached and detached.

SUMMARY OF THE INVENTION

A first object of the present invention is to provide a vehicle having an openable hood over side panels thereof with a structure so that its side panels can be attached and detached without an implement and can be prevented from shaking.

To address the first object, side panels are provided at the upper and lower portions thereof with inlets or retainers. A frame of the vehicle is provided at the upper and lower portions thereof with retainers or inlets corresponding to the respective inlets or retainers of the side panels. The side panels can then be easily mounted on the vehicle frame by only their vertical motion. The mounted side panels are prevented from longitudinal and lateral movement by engagement of the inlets in the retainers and from vertical movement by suppression of the closed hood.

A second object of the present invention is to provide a vehicle having an openable hood over a front panel thereof a structure so that its front panel can be attached and detached without an implement and can be prevented from shaking. To address the second object, a front panel is provided at the upper and lower portions thereof with inlets or retainers. A frame of the vehicle is provided at the upper and lower portions thereof with retainers or inlets corresponding to the respective inlets or retainers of the front panel. Therefore, the front panel can be easily mounted on the frame by only its vertical motion. The mounted front panel is prevented from longitudinal and lateral movement by engagement of the inlets in the retainers and from vertical movement by suppression of the closed hood.

With those and other objects in mind, the present invention's construction is hereinafter fully described, illustrated in the accompanying drawings, and set forth in the appended claims. It is understood that various changes in the operation, form, proportion and minor details of construction, within the scope of the claims, may occur without departing from the spirit of the invention or sacrificing any of the advantages thereof.

DETAILED DESCRIPTION OF THE PREFERRED EMBODIMENTS

Figure 1:
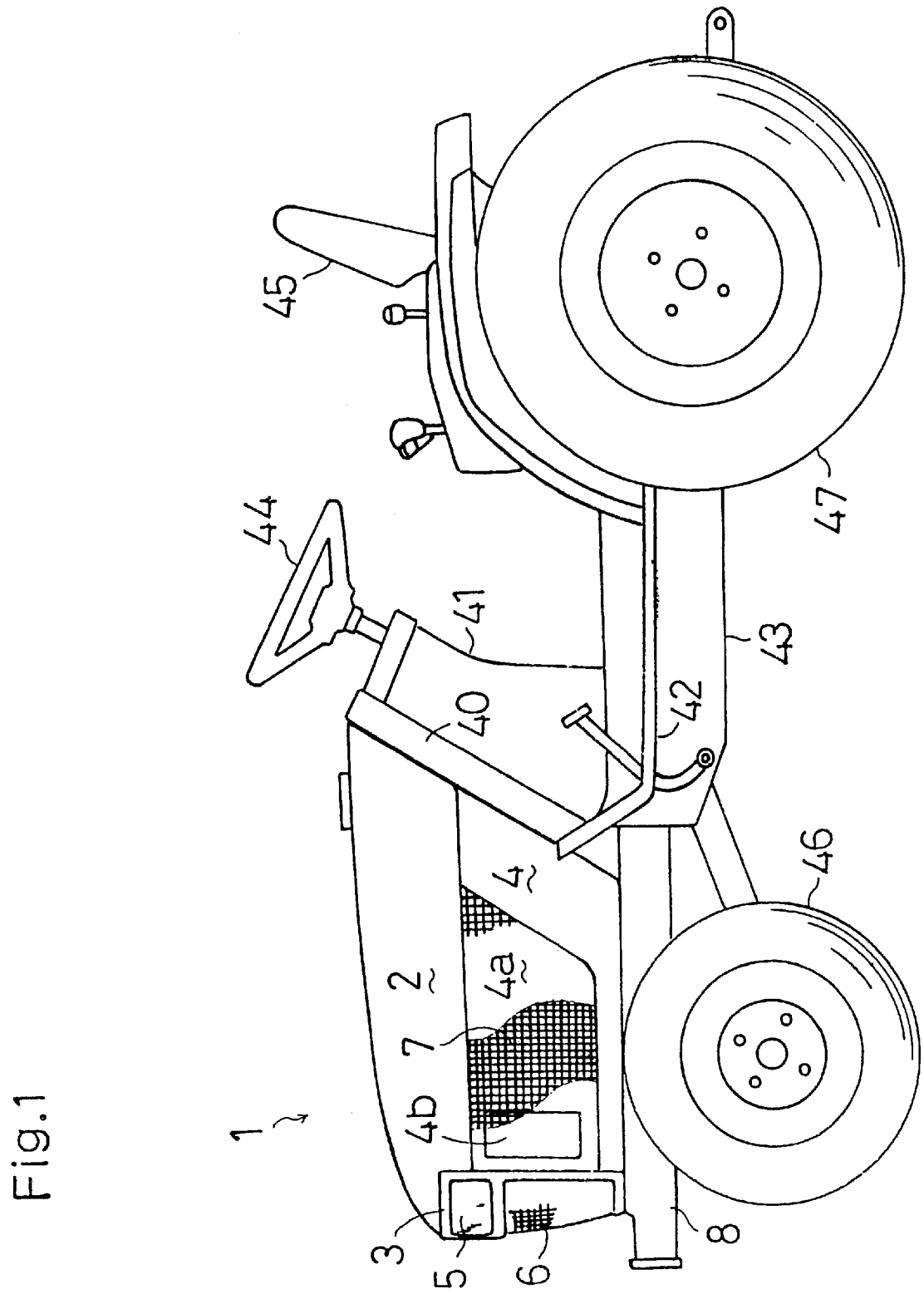
FIG. 1 is a side view of a tractor as a whole in accordance with the present invention.

The whole structure of a tractor of the present invention will now be described with particular reference to FIG. 1. Left and right parallel horizontal frames 8 are extended longitudinally forward from a body frame 43 including a clutch system, a transmission and the like. Left and right front wheels 46 are attached below horizontal frames 8, respectively. Also, left and right rear wheels 47 are attached on the left and right sides of the transmission which is disposed on the rear end of body frame 43.

Approximately horizontal steps 42 are provided on the left and right sides of body frame 43, respectively. On the rear portion of body frame 43 is mounted a seat 45. On the front portion of body frame 43 is mounted a dashboard 41 on which a steering wheel 44 is disposed. An arcuate first upright frame 40 is rearwardly slantingly erected on horizontal frames 8 in front of steps 42 so as to support the dashboard 41.

Figure 9:
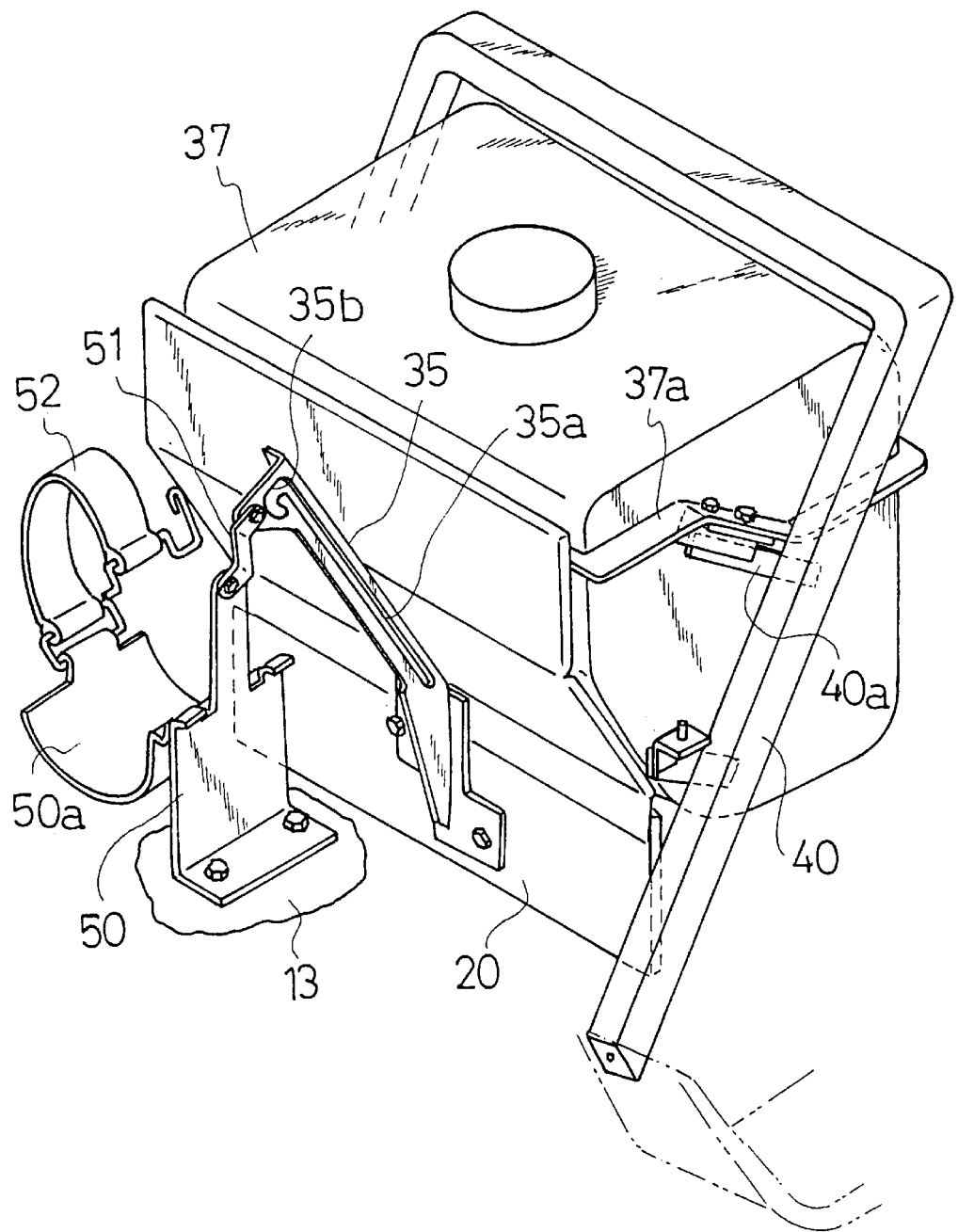
FIG. 9 is a perspective view of attaching portion of a guide rail.

As shown in FIG. 9, a resinous fuel tank 37 is disposed under first upright frame 40. Ribs 37a integrally formed on both side surfaces of fuel tank 37 are fixed on stays 40a which are disposed at the front ends of left and right vertical portions of first upright frame 40, respectively.

Figure 2:
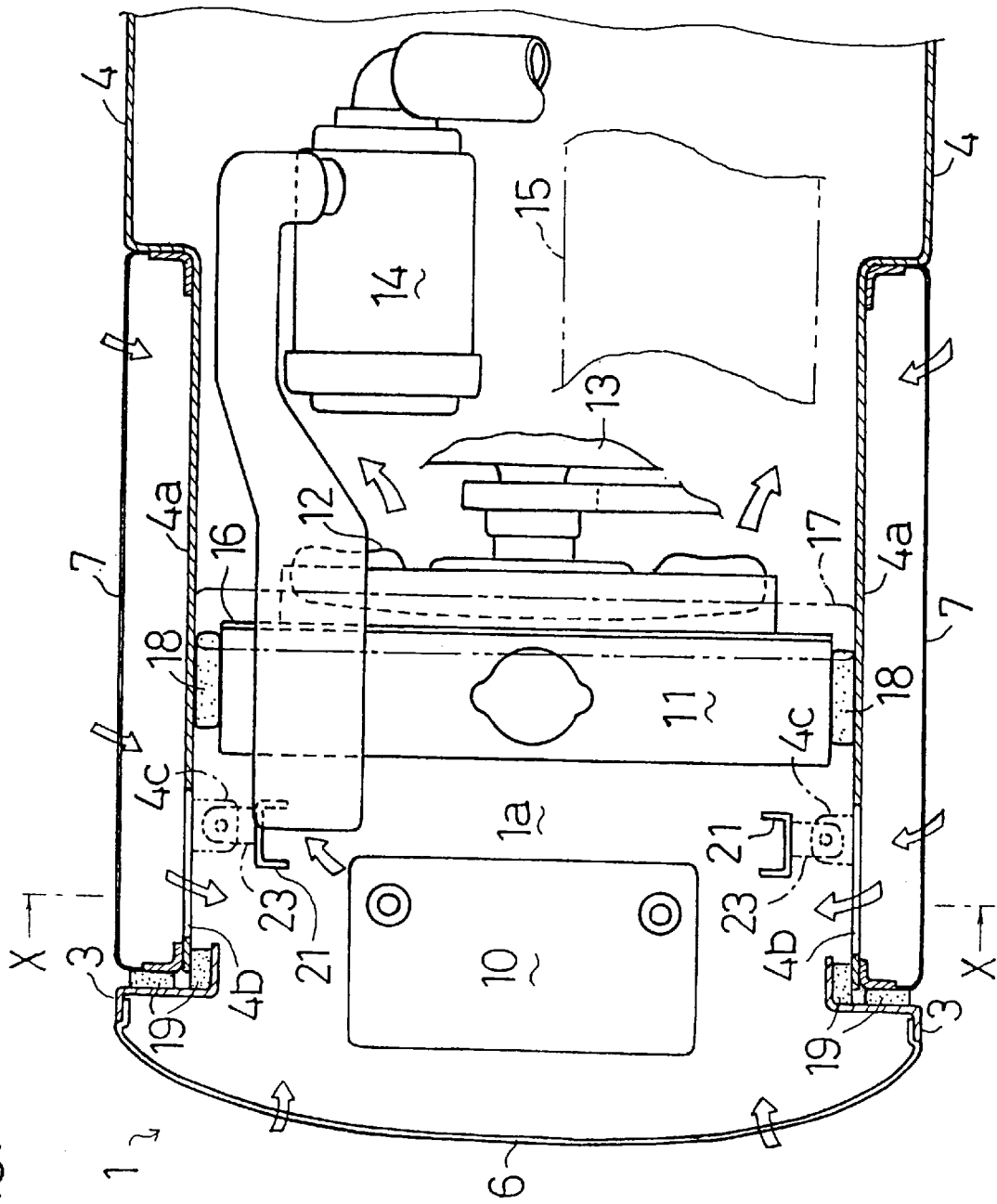
FIG. 2 is a plan view of an interior of a bonnet.

On horizontal frames 8 is disposed a bonnet 1, containing an engine 13 and the like (as shown in FIG. 2), which consists of an engine hood 2, a front panel 3 and both left and right side panels 4. Engine 13 is enclosed in the front and both sides thereof with front panel 3 and side panels 4, respectively. Engine 13 is covered at the top thereof with engine hood 2.

The inner structure of bonnet 1 will be described with particular reference to FIGS. 2 through 6. A bottom plate 9 is spread over front portions of horizontal frames 8. A battery 10 is mounted upon a front upper surface 9b of bottom plate 9. A radiator 11 is erected on a rear upper surface 9c of bottom plate 9. A cooling fan 12 for supplying cooling air to the rear portion of a vehicle is disposed behind radiator 11. Behind cooling fan 12 is disposed engine 13 which is supported by left and right horizontal frames 8 so as to isolate its vibration. An air cleaner 14 and a muffler 15 are laterally juxtaposed above engine 13.

A blocking plate 16 is fixedly interposed between radiator 11 and cooling fan 12. A sealing member 17, made of urethane rubber or the like, is stuck to the upper inner surface and each lateral inner surface of hood 2 so as to fill the gap between blocking plate 16 and closed hood 2. Also, sealing members 18 are stuck to both outer side surfaces of radiator 11 so as to abut each sealing member 18 against the respective inner surface of mounted side panels 4. Thus, radiator 11, blocking plate 16, sealing member 17 and sealing members 18 define a partition which divides the interior of bonnet 1 before and aft.

An assembly structure of bonnet 1 will be described with particular reference to FIGS. 1 through 7. Front panel 3 is provided at the upper left and right portions thereof with headlights 5. The lower portion of front panel 3, below headlights 5, is formed into a grille which is covered with a first dustproof net 6. A longitudinal recessed portion 4a, formed on the outside surface of each side panel 4, is covered with a second dustproof net 7. A grille 4b is open through the front area of recessed portion 4a.

The structure for mounting front panel 3 will now be described. Front panel 3 is provided on each of the upper and lower portions thereof with one or more inlet means or retaining means. The rearwardly extending segments 3a are disposed on the left and right upper portions of front panel 3. In this embodiment, rearwardly extending segments 3a are provided with through holes. On the left and right lower end portions of front panel 3 are provided downwardly projecting dowels 3b.

Figure 4:
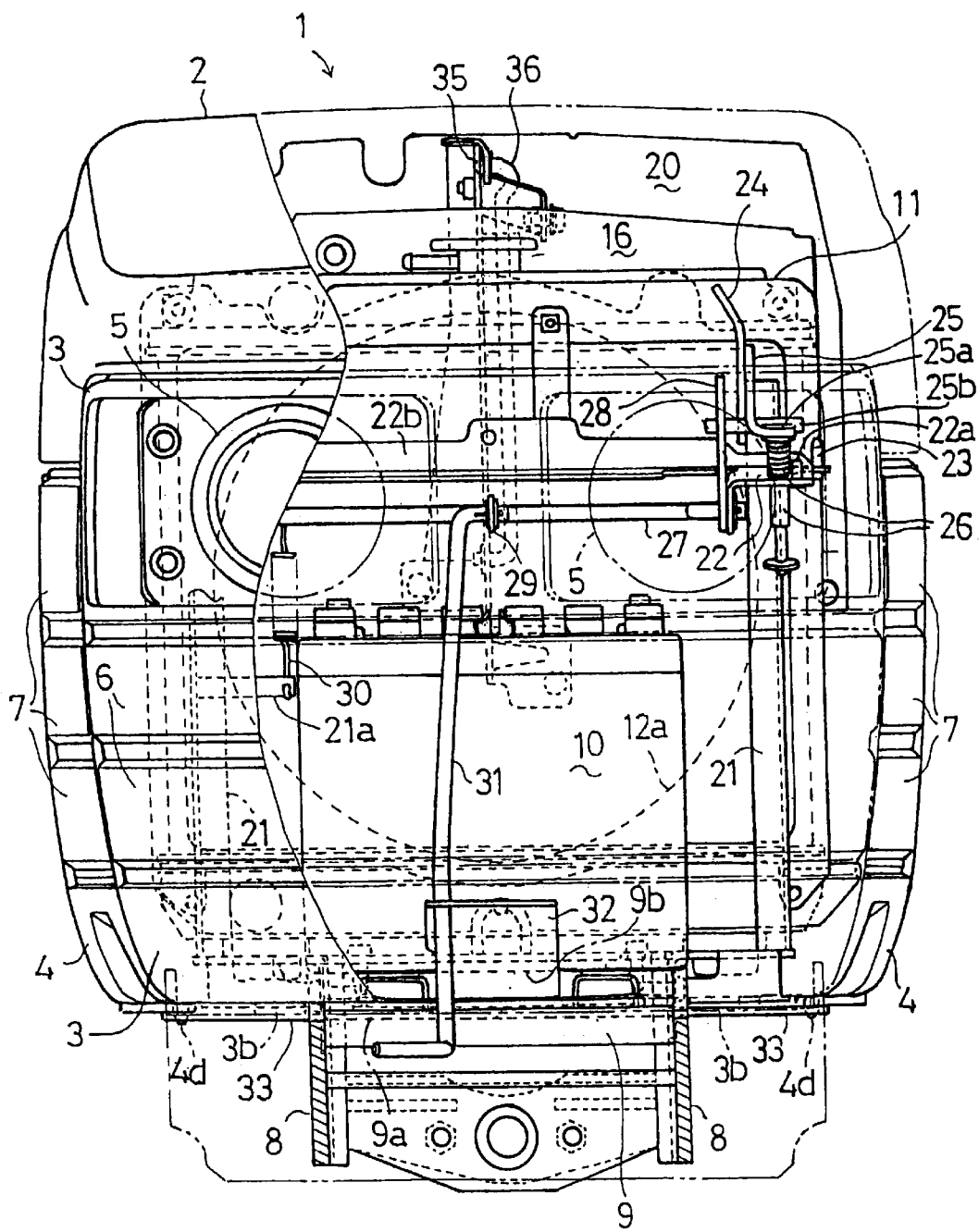
FIG. 4 is a front view of the interior of the bonnet centering a close-locking mechanism therein.
Figure 6:
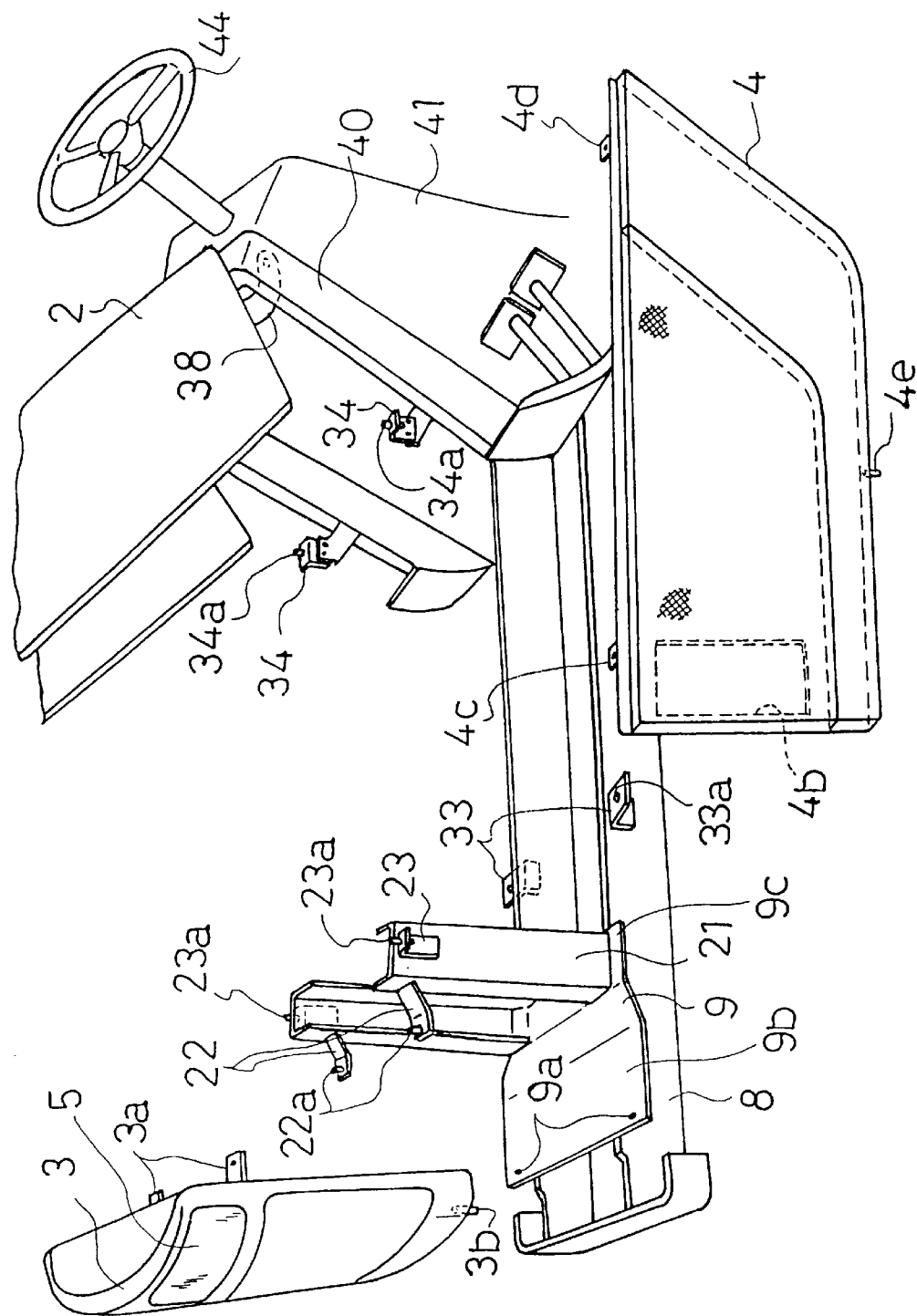
FIG. 6 is a perspective view of the bonnet from which side panels are removed.

Holes 9a (or grooves 9a as shown in FIG. 4), corresponding to respective dowels 3b, are bored in the front upper surface 9b of bottom plate 9. Furthermore, on the rear upper surface 9c, in front of radiator 11, are erected left and right second upright frames 21. Thus, as shown in FIG. 6, in front of body frame 43 is constructed a frame structure for supporting bonnet 1 comprising left and right horizontal frames 8, first upright frame 40, left and right second upright frames 22 and bottom plate 9. First upright frame 40 constitutes a first frame portion of the frame structure which supports dashboard 41. Left and right second upright frames 22 constitute a second frame portion of the frame structure which is adjacent to the front end of the vehicle.

Approximately horizontal, forwardly extending segments 22 are disposed on the upper front surfaces of respective second upright frames 21. Segments 22 are separated from each other in the embodiment shown in FIG. 6. However, in the embodiment shown in FIG. 4, segments 22 are integrally connected through a lateral frame 22b, which is fixedly attached to the front ends of second upright frames 21. Pins 22a upwardly project from respective front portions of segments 22. The vertical length of pin 22a is greater than that of dowel 3b to ensure a clearance between dowel 3b and hole 9a during insertion of pin 22a in segment 3a. In this regard, the vertical distance between segments 3a and the lower end of front panel 3 is identical with the vertical distance between segments 22 and front upper surface 9b.

To mount front panel 3 in this arrangement, it is lowered along the front end of second upright frames 21. As front panel 3 is lowered, pins 22a enter the holes of respective segments 3a and then dowels 3b enter respective holes 9a. Once front panel 3 is mounted, segments 3a fit on respective segments 22 and the lower end of front panel 3 fits on the front upper surface 9b of bottom plate 9. Thus, the installation of front panel 3 can be easily completed. Mounted front panel 3 is prevented from longitudinal and lateral movement when the inlets (pins 22a and dowels 3b) are engaged in the retainers (segments 22 and bottom plate 9 with holes 9a).

Next, the mounting structure of side panels 4 will be described. Each side panel 4 is provided on each of the upper and lower end portions thereof with one or more inlets or retainers. In the embodiment shown in FIG. 6, a front segment 4c and a rear segment 4d are disposed on the front and rear upper ends of side panel 4, respectively. Front segment 4c and rear segment 4d project laterally inward and are provided with respective through holes. On the horizontal lower end edge of side panel 4 is disposed a downwardly projecting pin 4e.

On the frame structure, first segments 23 and third segments 33 laterally outwardly project from the respective lateral outside surfaces of first upright frames 21 and horizontal frames 8. Second segments 34 laterally outwardly project from the left and right outside surfaces of first upright frame 40.

Figure 7:
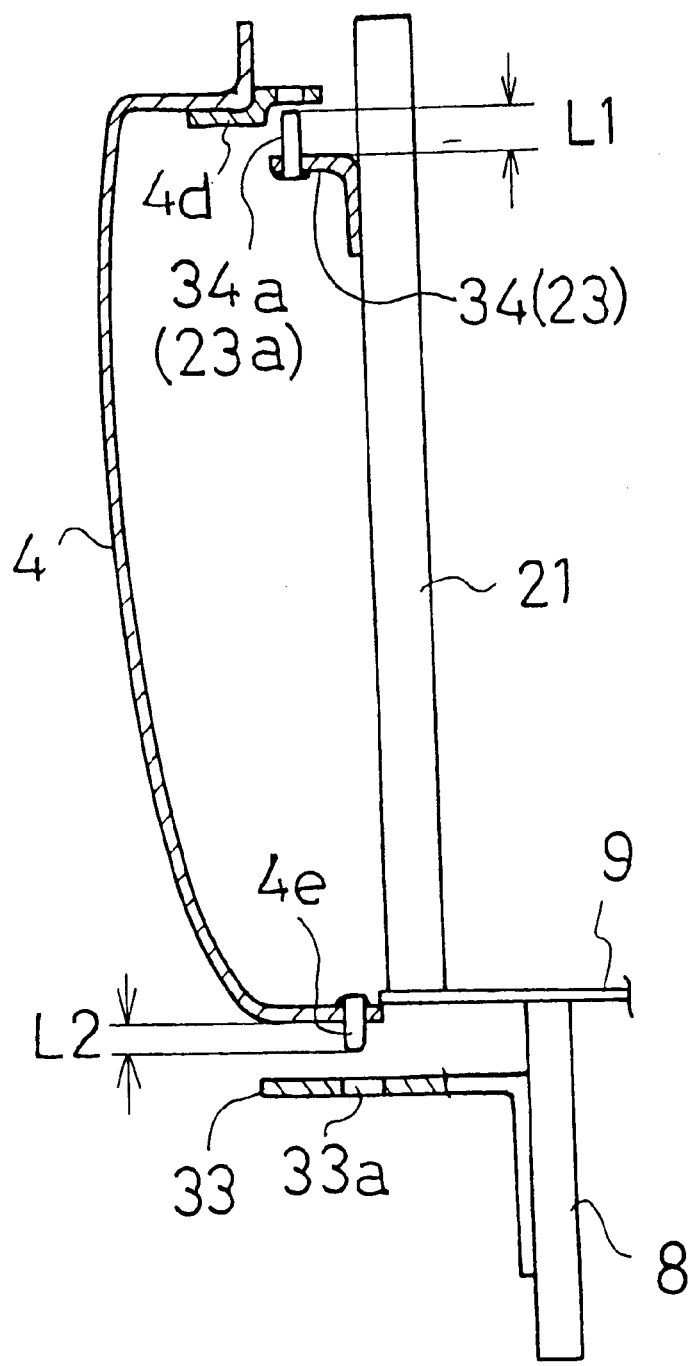
FIG. 7 is a sectional front view of engaging and engaged portions of the side panel and a body frame.

On first and second segments 23 and 34 are disposed upwardly projecting pins 23a and 34a, respectively. Third segments 33 are provided with holes 33a. As shown in FIG. 7, the vertical lengths L1 of pins 23a and 34a are longer than the vertical length L2 of pin 4e. This ensures a clearance between pin 4e and third segment 33 during insertion of pins 23a and 34a into segments 4c and 4d, respectively. In this regard, the vertical length of side panel 4 is identical with the vertical distance between first and second segments 23 and 34 and third segment 33.

Alternatively, a plurality of pins 4e may be provided along the horizontal lower end edge of each side panel 4. In this embodiment, a plurality of segments 33 are correspondingly provided on the outside surface of each horizontal frame 8.

To mount side panels 4, they are lowered along the lateral outside surfaces of first and second upright frames 21 and 40. As each side panel 4 is lowered, pins 23a and 34a enter the holes of segments 4c and 4d, respectively. Then pin 4e enters hole 33a. Once side panels 4 are mounted, segments 4c and 4d fit on segments 23 and 34, respectively; and the horizontal lower end edges of side panels 4 fit on segments 33. Thus, the installation of side panel 4 can be easily completed. Mounted side panel 4 is prevented from longitudinal and lateral movement when the inlets (pins 23a, 34a and 4e) are engaged in the retainers (segments 4c, 4d and 33).

Figure 5:
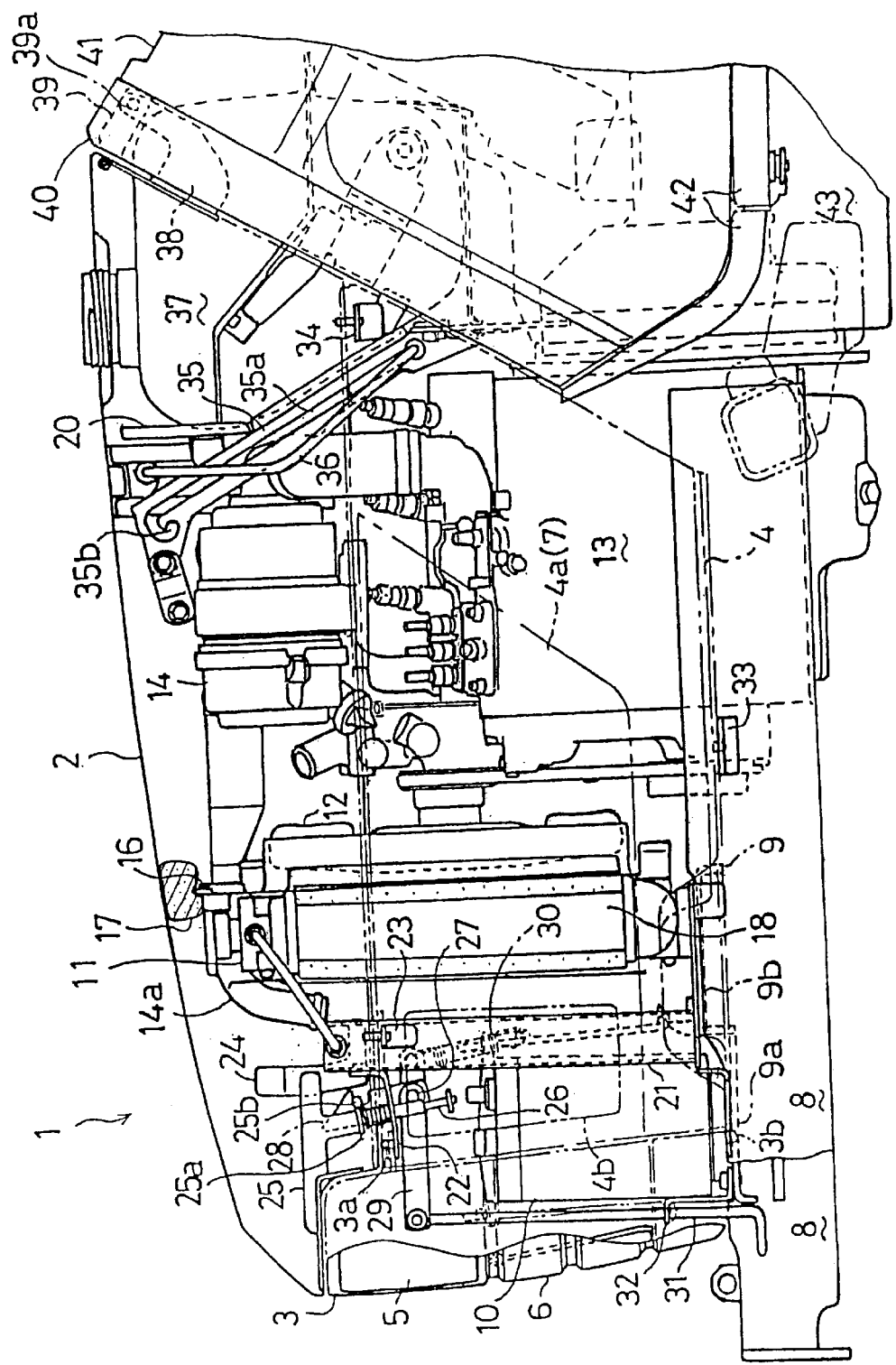
FIG. 5 is a side view of the interior of the bonnet.
Figure 8:
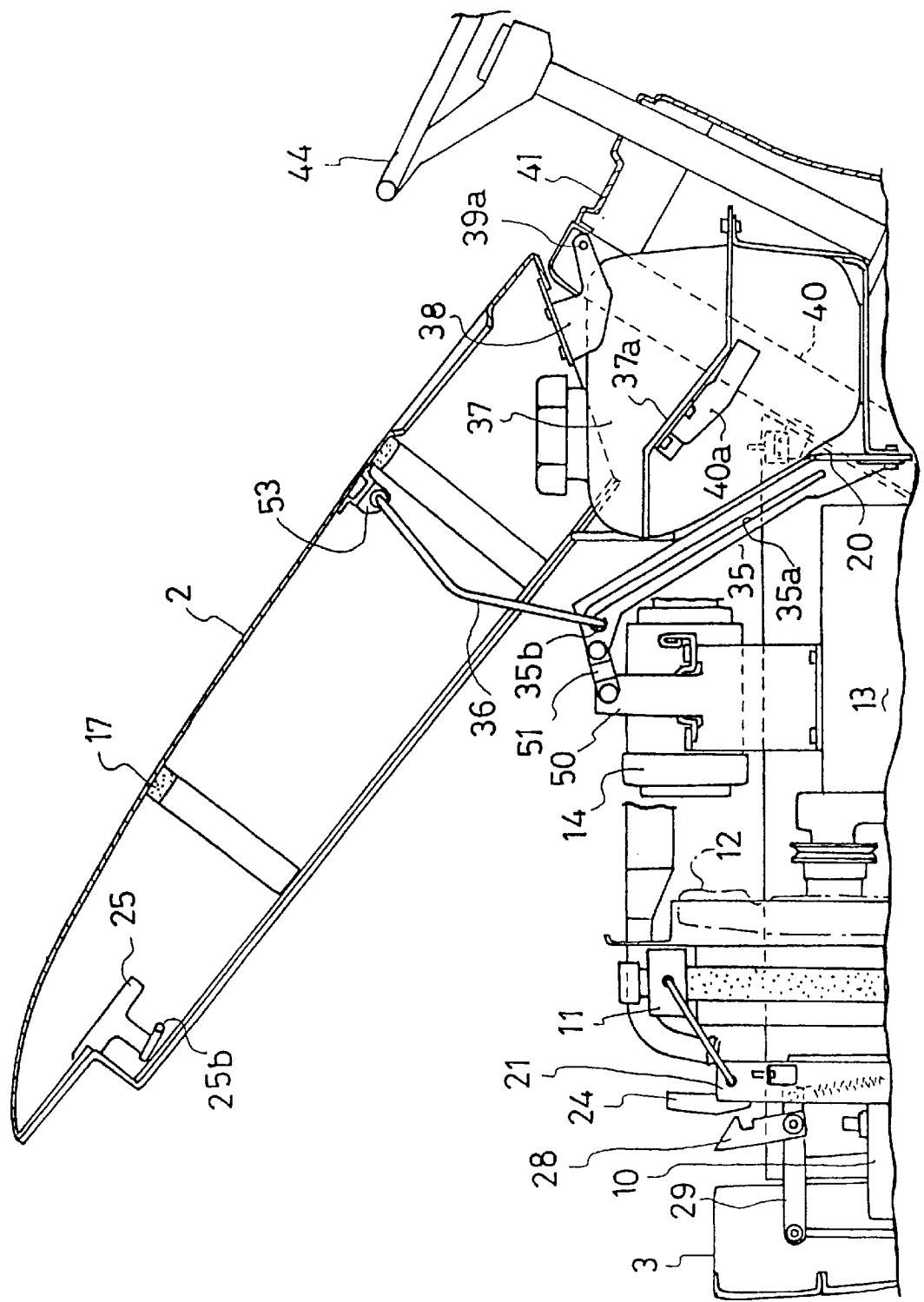
FIG. 8 is a sectional side view of the bonnet when a hood is opened.

Referring to FIGS. 5, 6 and 8, left and right hinges 38 disposed on the rear end of hood 2 are pivoted on respective pivotal pins 39a of left and right hinge stays 39. Left and right hinge stays 39 are fixedly attached to the upper portion of first upright frame 40, thereby enabling hood 2 to be vertically rotated. To lock hood 2 in the closed position, a close-locking mechanism is provided on second upright frames 21. Also, for locking hood 2 in an open position, an open-locking mechanism consisting of a guide rail 35 and a stand rod 36 are constructed in the upper space behind engine 13.

The close-locking mechanism will be described as shown in FIGS. 4 and 5. Guide members 24 upwardly project from respective second upright frames 21. Locking members 25 are fixedly attached to the left and right front portions of hood 2, so as to slide down along respective guide members 24 during the lowering of the front end of hood 2. An upward biased spring 26 is mounted on each segment 22 behind its pin 22a. Each locking member 25 is provided with a downwardly projecting pressing portion 25a. When closing hood 2, springs 26 are compressed by respective pressing portions 25a, thereby absorbing the shock from shutting the engine hood 2.

With reference to FIGS. 4 and 8, on the lower rear end of pressing member 25a is laterally fixed a locking pin 25b. Left and right hook members 28 are integrally attached near the lateral ends of a shaft 27 which is rotatably extended between left and right segments 22. This configuration enables hook members 28 to be longitudinally rotated along with the rotation of shaft 27. A spring stay rearwardly projects from shaft 27 near one of its ends. Another spring stay 21a projects from second upright frame 21 on the same side as the spring stay of shaft 27. A spring 30 is stretched between the spring stay of shaft 27 and spring stay 21a, so as to bias hook members 28 clockwise as viewed in FIG. 5.

As explained above, during lowering of the front end of hood 2, locking members 25 slide down along respective lateral surfaces of guide members 24. The locking pins 25b are pushed against respective cams formed on the free ends of hook members 28 so as to rotate hook members 28 forward against the biasing of springs 30. Finally, locking pins 25b are engaged in respective recessed portions of hook members 28 so that hook members 28 rearwardly rotate into their original positions. Thus, closed hood 2 is locked.

Figure 3:
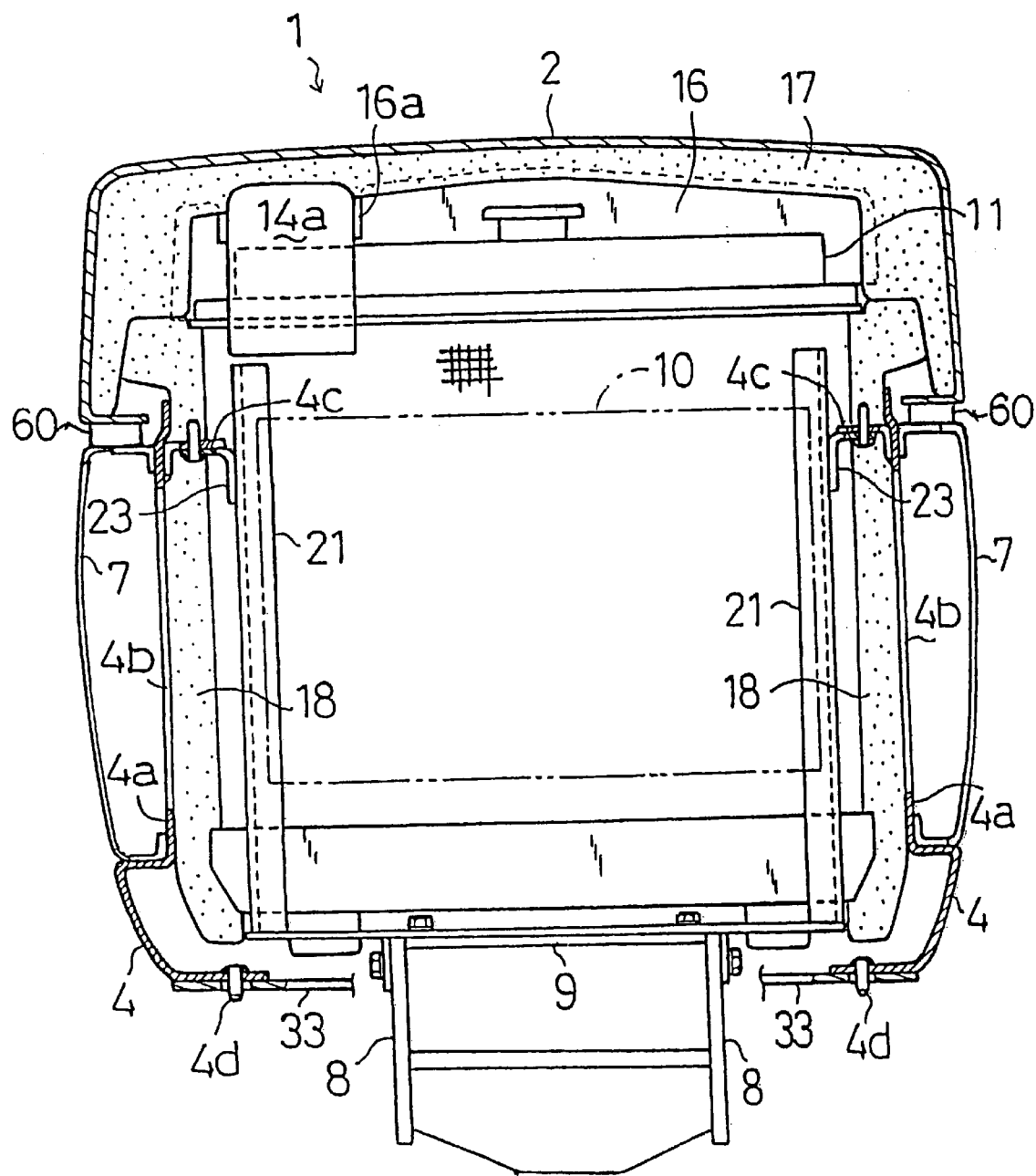
FIG. 3 is a sectional view in the direction of the arrows X—X in FIG. 2.

As shown in FIG. 5, the front lower end of hood 2 suppresses the upper edge of front panel 3 so as to prevent vertical movement of front panel 3. Also, as shown in FIG. 3, in the locked-closed position hood 2 suppresses the upper edges of both side panels 4 through sealing member 60 thereby preventing any vertical movement of side panels 4. Thus, front panel 3 and side panels 4 are prevented from falling off when hood 2 is in the locked-closed position.

Next, explanation will be given on a releasing mechanism to unlock closed hood 2. A rotating arm 29 forwardly extends near the lateral center of shaft 27. The front end of rotating arm 29 pivotally supports the top end of a lock-releasing lever 31. Lock-releasing lever 31 downwardly extends to below the lower end of front panel 3 through a lever guide 32 fixedly mounted on the front upper surface 9b of bottom plate 9. Lock-releasing lever 31 then bends forward between horizontal frames 8 thereby forming a grip. Once an operator inserts his hand below front panel 3 and pushes down lock-releasing lever 31, the front end of the rotating arm 29 downwardly rotates and hook members 28 integrally forwardly rotate so that locking pins 25b slip off hook members 28 whereby closed hood 2 is unlocked. When an operator lifts up the front end of hood 2 in this condition, hood 2 upwardly rotates utilizing pivotal shafts 39a of hinges 38 as a fulcrum.

The open-locking mechanism for locking hood 2 in an open position will be described with particular reference to FIGS. 4, 5, 8 and 9. A hot air blocking plate 20 disposed along the front surface of a fuel tank 37, in the rear area of the engine room, is attached to the lower portion of first upright frame 40. The lower portion of guide rail 35 is fixed to the lower center portion of plate 20. The upper portion of guide rail 35 is slantingly, upwardly, forwardly extended and is bored through in the longitudinal direction thereof with a guide slot 35a. The upper end of guide slot 35a is formed into a hook portion 35b, which is C-like shaped when viewed from the side. In this embodiment, guide slot 35a is provided with only one hook portion 35b, however, it is possible to form one or more additional hook portions 35b along guide slot 35a. When guide slot 35a is provided with a plurality of hook portions 35b, hood 2 may be locked open at several levels.

The top end of guide rail 35 is secured to an upper end of a support bracket 50 erected on engine 13 via a stay 51, thereby improving the strength of hot air blocking plate 20. Also, such an arrangement makes plate 20 integrally connected with engine 13, thereby reducing vibration of plate 20 so that it is stabilized while opening hood 2. Support bracket 50 is joined with a half-divided cylindrical retaining plate 50a, so that an air cleaner 14 may be secured onto retaining plate 50a by band 52.

Furthermore, a pivotal support stay 53 downwardly projects from the inner surface of the rear center portion of hood 2. The crank-like upper end of a stand rod 36 is inserted into pivotal support stay 53 so as to pivotally hang stand rod 36. While hood 2 is opened, the pivotal support stay 53 remains positioned behind hook portion 35b of guide slot 35a and approaches pivotal pins 39a at the center of rotation of hood 2. Thus, hood 2 can be wide open despite the short length of stand rod 36.

The crank-like lower end of stand rod 36 is inserted into guide slot 35a so as to be slidably guided therein. Stand rod 36 is doglegged so that the lower half thereof rearwardly extends when hood 2 is shut. Hence, stand rod 36 is compactly contained within the engine room without interfering with fuel tank 37 and plate 20.

While lifting the front end of hood 2 during opening, the lower end of stand rod 36 upwardly slides in guide slot 35a. Once hood 2 is opened as wide as possible, the operator pulls the lower end of stand rod 36 forward, so as to engage it in hook portion 35b, and slightly lowers the front end of hood 2. As a result of the operator's action, stand rod 36 is supported between pivotal support stay 53 and hook portion 35b so that hood 2 is locked in the open position. Engaging the crank-like lower end of stand rod 36 into hook portion 35b is the only required operation for locking open hood 2 making it easy for the operator to perform.

Once hood 2 is locked in the open position, the various parts in the engine room of bonnet 1 can be maintained. In addition, the mounted front panel 3 and mounted side panels 4 can be easily removed from the vehicle body by merely upwardly pulling them because the inlets of panels 3 and 4 naturally slip out of their respective retainers as a result of such action.

To unlock hood 2 in the open position, hood 2 is slightly lifted, whereby stand rod 36 is also lifted so that the lower end thereof disengages from hook portion 35b and engages guide slot 35a. Hood 2 is then lowered, so that the lower end of stand rod 36 descends along guide slot 35a. Finally, hood 2 is locked closed through the aforementioned close-locking mechanism.

What is claimed is:

1. A panel mounting system for a vehicle comprising:
   a first engaging means including one of an inlet and a retainer provided on an upper and a lower portion of a frame structure of the vehicle;

a panel provided with a second engaging means including one of a retainer and an inlet corresponding to said first engaging means on said frame structure, wherein said panel is mounted onto said frame structure so as to be prevented from longitudinal and lateral movement by engagement of said first and second engaging means, and a hood disposed so as to be opened and closed over said mounted panel, wherein when said hood is in a closed position, said hood prevents vertical movement of said panel.

2. A panel mounting system for a vehicle as set forth in claim 1, wherein said first engaging means on said upper portion of said frame structure of the vehicle is a substantially vertically projecting pin and said second engaging means on said panel is a retainer into which said pin can be vertically inserted.

3. A panel mounting system for a vehicle as set forth in claim 1, wherein a plurality of said first engaging means provided on the upper portion of said frame structure are disposed in a horizontal row.

4. A panel mounting system for a vehicle as set forth in claim 1, wherein said panel includes two side panels one disposed under each of left and right lower ends of said hood when it is in a closed position.

5. A panel mounting system for a vehicle as set forth in claim 4, wherein said first engaging means on said upper portion of said frame structure of the vehicle is a substantially vertically projecting pin and said second engaging means on said side panel is a retainer into which said pin can be vertically inserted.

6. A panel mounting system for a vehicle as set forth in claim 4, wherein a plurality of said first engaging means provided on said upper portion of said frame structure are disposed in a longitudinally-horizontal row.

7. A panel mounting system for a vehicle as set forth in claim 6, further comprising:

a first frame portion of said frame structure which supports a dashboard, wherein one of said first engaging means is provided on said upper portion of said first frame portion of said frame structure.

8. A panel mounting system for a vehicle as set forth in claim 6, further comprising:

a second frame portion of said frame structure disposed adjacent to a front end of the vehicle, wherein one of said first engaging means is provided on said upper portion of said second frame portion of said frame structure.

9. A panel mounting system for a vehicle as set forth in claim 1, wherein said panel is a front panel disposed under a front lower end of said hood when it is in a closed position.

10. A panel mounting system for a vehicle as set forth in claim 9, wherein said first engaging means on said upper portion of said frame structure of the vehicle is a substantially vertically projecting pin and said second engaging means on said front panel is a retainer into which said pin can be vertically inserted.

11. A panel mounting system for a vehicle as set forth in claim 9, wherein a plurality of said first engaging means provided on said upper portion of said frame structure are disposed in a laterally horizontal row.

12. A panel mounting system for a vehicle as set forth in claim 11, further comprising:

a frame portion of said frame structure disposed adjacent to a front end of the vehicle, wherein said first engaging means on said upper portion of said frame structure are disposed in a laterally-horizontal row on said frame portion.

13. A panel mounting system for a vehicle as set forth in claim 1, wherein said panel includes a front panel which is provided under a front lower end of said hood in a closed position and two side panels one of which is provided under each of left and right lower ends of said hood in a closed position.

14. A panel mounting system for a vehicle as set forth in claim 13, wherein said first engaging means provided on said upper portion of said frame structure of the vehicle is a substantially vertically projecting pin and said second engaging means on each of said front and side panels is a retainer into which said pin can be vertically inserted.

15. A panel mounting system for a vehicle as set forth in claim 13, wherein a plurality of said first engaging means provided on said upper portion of said frame structure and said second engaging means of said front panel are disposed in a laterally-horizontal row and a plurality of said first engaging means on said upper portion of said frame structure and said second engaging means of said side panel are disposed in a longitudinally-horizontal row.

16. A panel mounting system for a vehicle as set forth in claim 15, further comprising:

a frame portion of said frame structure of the vehicle disposed adjacent to a front end of the vehicle, wherein said first engaging means are provided on said frame portion so as to correspond to said second engaging means of said front panel and to said second engaging means of each of said side panels.

17. A panel mounting system for a vehicle comprising:

a frame structure of the vehicle provided on an upper side portion thereof with an upwardly projecting inlet and a lower side portion thereof with a first recessed retainer;

a side panel provided on an upper portion thereof with a second recessed retainer corresponding to said upwardly projecting pin of said frame structure and provided on a lower portion thereof with a downwardly projecting pin corresponding to said first recessed retainer of said frame structure, wherein said side panel is detachably mounted by vertically lowering said side panel onto said frame structure so as to engage said upwardly and downwardly projecting pins into said second and first recessed retainers, respectively, whereby said side panel is prevented from longitudinal and lateral movement by the aforementioned engagement of said upwardly and downwardly projecting pins into said first and second recessed retainers, and;

a hood disposed so as to be opened and closed over said side panel when it is mounted to said frame structure, wherein a side lower end of said hood in a closed position prevents the vertical movement of said side panel.

18. A panel mounting system for a vehicle comprising:

a frame structure of the vehicle provided on an upper side portion thereof with an upwardly projecting pin and a lower side portion thereof with a first recessed retainer;

a front panel provided on an upper portion thereof with a second recessed retainer corresponding to said upwardly projecting pin of said frame structure and on a lower portion thereof with a downwardly projecting pin corresponding to said first recessed retainer of said frame structure, wherein said front panel is detachably mounted by vertically lowering said front panel onto said frame structure so as to engage said upwardly and downwardly projecting pins into said second and first recessed retainers, respectively, whereby said front panel is prevented from longitudinal and lateral movement by the aforementioned engagement of said upwardly and downwardly projecting pins into said second and first recessed retainers, and;

a hood disposed so as to be opened and closed over said front panel when said front panel is mounted to said frame structure, wherein a front lower end of said hood in a closed position prevents the vertical movement of said front panel.

* * * * *